United States Patent [19]

Imanaka et al.

[11] Patent Number: 4,719,536

[45] Date of Patent: Jan. 12, 1988

[54] WHEEL-SLIP DETECTION SYSTEM

[75] Inventors: Asaji Imanaka; Tatsuo Fujiwara, both of Kobe; Shuichi Osaka, Osaka, all of Japan

[73] Assignee: Nippon Air Brake Co., Ltd., Kobe, Japan

[21] Appl. No.: 849,921

[22] Filed: Apr. 9, 1986

[30] Foreign Application Priority Data

Apr. 9, 1985 [JP] Japan .................... 60-76123

[51] Int. Cl.$^4$ .............................................. B60T 8/64
[52] U.S. Cl. ...................................... 361/238; 303/111
[58] Field of Search ................. 361/238; 303/105, 106, 303/111

[56] References Cited

U.S. PATENT DOCUMENTS 4,060,285 11/1977 Jones .................................. 361/238
4,446,522 5/1984 Sato et al. ........................... 303/105

Primary Examiner—L. T. Hix
Assistant Examiner—David M. Gray
Attorney, Agent, or Firm—J. B. Sotak

[57] ABSTRACT

A wheel-slip detection system and/or method for implementing self-readhesion or resticking viscous sticking phenomenon after all the wheels of a car have assumed a slipping condition. The detected data are self-retained until all of the wheel speed differences $\Delta V$ become smaller than the first speed value $\Delta a2$ regardless of the restoration of all wheel acceleration by the brake release application. Through this method, it is possible to prevent repeated occurrence of any simultaneous gentle or sluggish-slip state of all the wheels when self-readhesion application is not expected so that the increase of brake distance is avoided.

2 Claims, 3 Drawing Figures

WHEEL-SLIP DETECTION SYSTEM

FIELD OF THE INVENTION

This invention relates to a brake system for railroad cars in which the speed of the wheels fixed to the cars is detected and based on the speed signals to evaluate and to determine whether a slipping condition is occurring on the wheels of the car.

BACKGROUND OF THE INVENTION

There is a wheel-slip detection system shown and described in Japanese Pat. No. 57-55001, which is a prior type of method for detecting wheel-slip. This patent relates to the detection of the speeds of all the wheels and the selection of the one with the highest speed to establish the basic speed reference to which the speeds of the various wheels are compared to determine the speed differential, or to determine the differential value of said speed differentials or differentiating the various wheels of said wheels to obtain the reduced speeds. When these various speed differentials, the various differential values, or the various reduced speeds exceed the set value, this unit determines that skidding of the wheels is occurring in this method. This skidding information is transmitted to the braking system, and is used to control the braking force applied to the wheels of the car.

In the case of railroad vehicle wheels, even when said braking force is not decreased, there are times when the slipping condition is dissipated naturally in a "resticking viscous sticking phenomenon" or self-readhesion. This phenomenon, or effect, shortens the controlling distance so that it is something which should be utilized as much as possible.

The prior art method of accomplishing the above results is by making the set value higher than a certain selected value and expanding the relative spread of the insensitive width, so that it is possible to detect a smaller slipping condition if the above-mentioned method was employed.

On the other hand, when all of the wheels of the car have almost the same small skidding values, the wheel which serves as the basic wheel is in a skidding situation, and the speed differential of the various wheels with respect to the basic speed or the differential speeds of said speed differential are small, or when the speeds of each wheel are differentiated in order to yield a small differential speed. The method of the prior art in which the set value is in the insensitive zone was made large and the small slips, hereafter called "sluggish slip", cannot be detected, no matter how long it takes. It will be appreciated that in the worst possible case, when all the wheels of the car become locked and the control distance to be extended causes damage to the outer rims of the wheels, namely, causing flat spots on the wheels, become a problem.

OBJECTS AND SUMMARY OF THE INVENTION

This invention utilizes the resticking viscous or self-readhesion effect phenomenon when a large number of wheels are in a sluggish slip. The system detects this situation and makes possible a reduction in the control distance and, at the same time, prevents the formation of flat spots on the outer rims of the wheels. Once the sluggish slips are generated and when the sluggish slips take place, the detection state is maintained until the wheels return to approximately normal speeds to improve the shortening of the control distance or to prevent the formation of flat spots, which are the objectionable. The specific means are provided to detect the speed of n wheels, where n is an integer of 3 or higher; and then selecting the wheel with the highest speed as the standard speed and to determine the speed differential with respect to the selected wheel relative to the various other wheels. The system then determines the differential values of the differential speeds to ascertain the proper speed reduction by differentiating the speed of the wheels and using these speed differentials or their differentiated values to determine whether the standard value is exceeded. In this method for detecting slips, there is a first set value, and a second set value larger than said first set value.

When the first set value is exceeded at a speed differential, its differentiated value or the number of reduced speeds become greater than the set number, the speed differential or its differential value fall below the second set value, and all the accelerations determined by differentiating the speeds of the various wheels fall below the basic acceleration, all wheels are determined to be slipping, and therefore all-wheels-slipping information provides an output.

After this all-wheels-slipping information has been outputted, this information is stored as well as when at least one of the accelerations or its differentiated value exceeds the first set value and said all-wheels-slipping information is stored in accordance with the present invention.

According to the present method of this invention, when a large number of wheels of the particular car go into the "sluggish slip" state, the greater number of the speed differential, its differential value, or its reduced speed exceeds the first set value so that its number becomes greater than the set number, and when all of the accelerations fall below the standard acceleration. In other words, the speed differentials or the reduced speeds between the various wheels during braking become small and, in addition, the situation becomes limited to when the wheels are not in a state of acceleration (recovery), such as when the self-readhesive viscous behavior can be expected. This is detected as a "sluggish slip" of the wheels.

At the same time, when the information is received that all the wheels are slipping, an output occurs. The output is followed by an acceleration evaluation which will maintain the all-wheels-slipping information, even when some of the wheels are in a speed recovery mode during the speed-determining period. Furthermore, when at least one of the speed differentials or its differential value exceeds the first set value, the acceleration evaluation circuit determines that the wheels have not yet fully recovered so that it memorizes or stores all-wheels-slipping information. When all of the speed differentials become less than said first set value and the speed of all the wheels have returned to approximately normal speeds so that the sluggish slip is resolved, another evaluation is made, and the all-wheels-slipping information disappears or is dumped.

In addition, after the all-wheels-slipping information is outputted and at least one of the speed differential types exceeds the second set value, it will be determined that the wheels corresponding to this state have experienced significant slipping and such slipping information is outputted and, at the same time, the all-wheels-slipping information will be dumped.

Further, once the all-wheels-slipping information has been produced and when at least one of the speed differentials exceeds the second set value, the wheels in this slip state are considered to be slipping excessively.

BRIEF DESCRIPTION OF THE DRAWINGS

The above objects and other attendant features and advantages of the present invention will become more readily apparent from the following detailed description, when considered in conjunction with the accompanying drawings, wherein.

BRIEF DESCRIPTION OF THE INVENTION

In the following explanation of the preferred embodiment, it will be assumed that the number of wheels n is four (4) with reference to FIG. 1.

Figure 1:
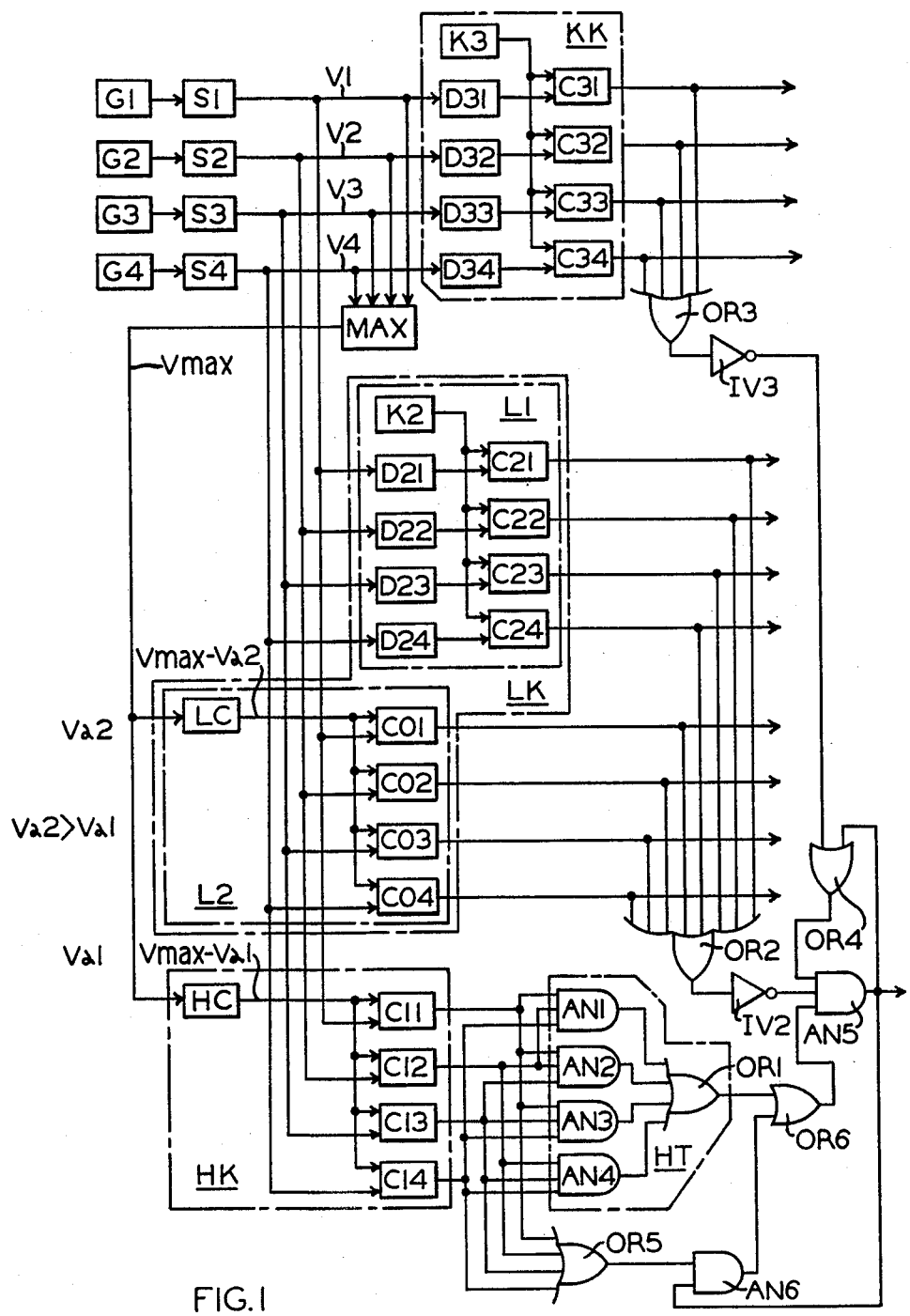
FIG. 1 is a block diagram of a preferred embodiment of the wheel-slip detection system, which incorporates the apparatus described in the subject invention.

Referring to the drawings, and in particular to FIG. 1, there is one example of a wheel-slip detection system which incorporates the operational method of the present invention.

As shown, four (4) velocity generators G1, G2, G3, and G4 are provided near each end of the axles for generating alternating current voltage signals having a frequency proportional to the rotational speed of the respective wheel of the vehicle. The output signals of the generators G1-G4 are fed to the respective one of four (4) speed or velocity-detection circuits S1-S4, which produce speed differentials corresponding to the frequency of the wheels V1-V4. These speed signals V1-V4 are transmitted to the recovery-detection circuit KK and also to the maximum-speed generation circuit MAX, as well as to the low-sensitivity slip-detection circuit LK and the high-sensitivity slip-detection circuit HK.

The recovery-detection circuit KK differentiates the speed signals V1-V4 and compares the acceleration signals derived from the detection units D31-D34 with the acceleration signal produced by an acceleration generation circuit K3. The acceleration comparison circuits C31-C34 compare the acceleration signals from said detectors D31-D34 with the standard acceleration signal of said generation circuit K3. Each comparator outputs a "0" signal when the various acceleration signals are below the standard acceleration signal, and outputs a "1" when the various acceleration signals exceed the basic acceleration signal.

That is, when the acceleration of the differentiated wheel speed exceeds the selected standard acceleration, the recovery-detection circuit KK will be expected to be in a self-resticking state. In addition, the output of said recovery-detection circuit KK is transmitted by way of an OR gate OR3, an inverter IV3, and an OR gate OR4 to an AND gate AN5 and, in turn, to the brake control apparatus (not shown) to convey the behavior and the acceleration information of each of the various wheels.

The maximum-speed generation circuit MAX selects the highest number (fastest) of speed signals V1-V4 from said detection circuits S1-S4 and outputs this value as the standard speed signal $V_{max}$, and transmits this value to the second basic speed generator circuit LC of the low-sensitivity slip-detection circuit LK and to the first standard speed generator circuit HC of the high-sensitivity slip-detection circuit HK.

The low-sensitivity slip-detection circuit LK includes a deceleration speed-detection circuit L1 and a speed-differential detection circuit L2.

The deceleration speed-detection circuit L1 compares the outputs of the deceleration speed detectors D21-D24, obtained by differentiating speed signals V1-V4, with the standard low-speed generator K2. The standard deceleration speed signals from the generator K2 or deceleration speed signals from the detector circuits D21-D24 output "0" when the respective deceleration speed signals drop below the standard deceleration speed signals, and "1" when the respective deceleration speed signals exceed the standard deceleration signals.

In other words, when the deceleration speed detection circuit L1 for low-sensitivity exceeds the comparatively large standard deceleration speed obtained by differentiating the vehicle speed, it is assumed that a large slipping condition is occurring on the wheels of the car. The output of the detection circuit L1 is transmitted to the AND gate AN5 by way of the OR gate OR2 and inverter IV2, and is simultaneously transmitted as deceleration speed information of each wheel to the dynamic control mechanism and brake control device and other devices carried by the car.

The speed differential detection circuit L2 inputs the standard speed signals $V_{max}$ from the maximum speed generation circuit MAX, and compares the second standard speed generator signals LC output as the difference between the standard speed signals and the second set value $V_{max}-V_{a2}$ and the various speed signals V1-V4 and the second basic signals $V_{max}-V_{a2}$, and outputs "1" when each speed signal V1-V4 falls short of the second basic speed signal $V_{max}-V_{a2}$, and outputs "0" when the various speed signals V1-V4 exceed the second basic speed signal $V_{max}-V_{a2}$ through the second speed differential comparator C01-C04 which make up this system.

That is, this low-sensitivity speed differential detector L2 compares the various speed signals V1-V4 with the standard speed signals $V_{max}$ and when the speed differential exceeds the second set value $V_{a2}$, which is comparatively large, it is assumed that significant slipping is generated by the wheels of the car. The output of the detection circuit L2 is transmitted to the AND gate AN5 through the OR gate OR2 and inverter IV2 and, at the same time, the information is transmitted as low-sensitivity slipping information to the other devices.

As a result, when the low-sensitivity slip-detection circuit LK, comprised of the deceleration speed detector L1 and speed differential detection circuit L2, outputs "1" from either of the comparators C21-C24 and C01-C04, it will be assumed that significant slipping has occurred in one of the corresponding wheels of the car, while when "0" is the output, it will be assumed that no significant slipping has been generated in any of the wheels of the car.

The high-sensitivity slip-detection circuit HK inputs the standard speed signals $V_{max}$ from the maximum speed generation circuit MAX and compares the first standard speed generator HC output as the first standard speed signals from the results $V_{max}-V_{a2}$, obtained by reducing the first set value $V_{a1}$ from which the standard speed signal $V_{max}$ has been substracted, and outputs "1" when each speed signal V1-V4 drops short of the first standard speed signal $V_{max}-V_{\alpha 1}$ and is comprised of the first speed differential comparator C11-C14.

That is, this high-sensitivity slip-detection circuit HK compares the various speed signals V1-V4 with the standard signal $V_{max}$ and when the speed differential exceeds the comparatively small first set value $V_{\alpha 1}$, it assumes the comparatively small fist set value $V_{\alpha 1}$, it assumes that slipping has been generated on at least one of the wheels of the car. Conversely, when the speed differential is less than the first set value $V_{\alpha 1}$, it assumes that no slipping is present in the wheels. The output of the detection circuit HK is not only transmitted to the high-sensitivity wheel-slip evaluation circuit HT, but is also transmitted through OR gate OR5, AND gate AN5, and OR gate OR6 to the AND gate AN5.

The high-sensitivity wheel-slip evaluation circuit HT uses the number 3 as the set number for making evaluations and is comprised of AND gates AN1-AN4 and OR gate OR1. When three (3) of the first speed differential comparators C11-C14 of the high sensitivity slip-detection circuit HK outputs "1", OR gate OR1 outputs "1", and this is used to determine that the majority of wheels of the car are slipping. Conversely, when the number of first speed differential comparators is two (2) or less, it is assumed that there is no slipping in a majority of the car wheels. The output of the evaluation circuit HT is transmitted through the OR gate OR5 to the AND gate AN5.

The output side of this AND gate AN5 is connected to the input side of said OR gate OR4. The AND gate AN5 and OR gate OR4 make up a stick or self-latching circuit. At the same time, the output side of the AND gate AN5 is connected to the input side of the AND gate AN6 which, together with the OR gate OR6, make up a stick or self-latching circuit. When the output from this AND gate AN5 is "1", this is information on all-axles-slipping, namely, sluggish-slip, and this information is transmitted to all the other equipment.

The operation of the equipment illustrated in FIG. 1 will be explained in greater detail below, with reference to FIGS. 2 and 3, which specifically illustrate a graphic example of the speed V translation for each wheel of the car during braking at time t.

Figure 2:
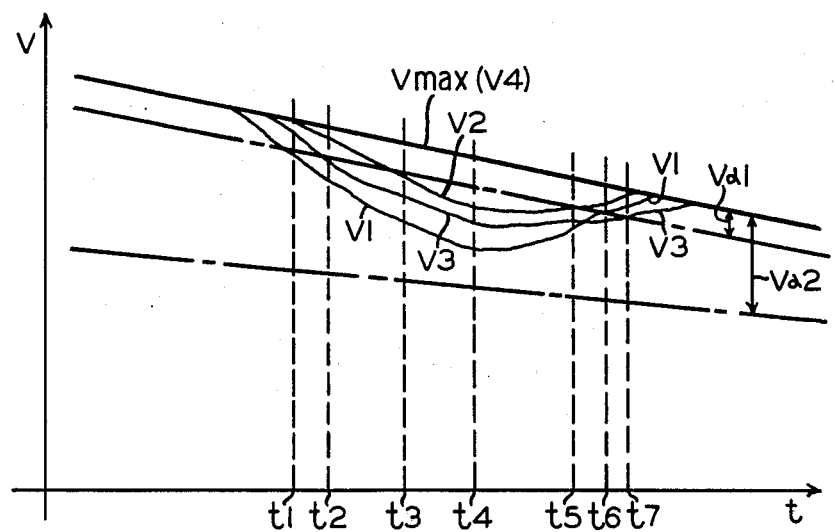
FIGS. 2 and 3 are graphic illustrations of the changing status curves of velocity V during the braking time, in relation to the time t which is a representation of the operation of the system shown in FIG. 1.
Figure 3:
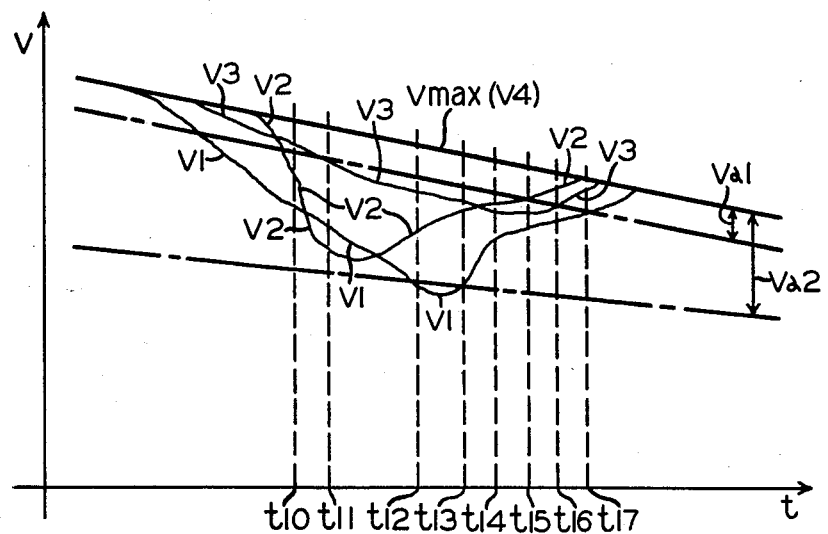

In FIGS. 2 and 3, V4 is the speed $V_{max}$ of the high-speed axle wheel, and V1-V3 are the speeds of the wheels on the other axles, while $V_{\alpha 1}$ is the first set value, and $V_{\alpha 2}$ is the second set value.

Initially, let us consider the graphic example of FIG. 2. It will be seen that there is no axle in acceleration up to time t1. Thus, there is no axle which exceeds the standard reduced speed, and the speed differential between the axles is less than the first set value $V_{\alpha 1}$ and none of the wheels is slipping.

Up to time t1, the outputs of all the acceleration comparators C31-C34 of the deceleration detection circuit KK are "0", and the output of the deceleration speed comparators C21-C24 of the low-sensitivity slip-detection circuit LK and the second speed differential comparators C01-C04 are "0", and the output of the OR gate OR2 is "0" and that of the inverter IV2 is "1". On the other hand, the outputs of all the first speed differential comparators C11-C14 of the high-sensitivity slip-detection circuit HK are "0", and the output of the OR gate OR1 of the high-sensitivity number of slipping axles evaluation circuit HT is "0", while the output of the OR gate OR6 is "0". In other words, up to the time t1, the output of the OR gate OR6, which is one of the inputs to the AND gate AN5, is "0", and the output of the AND gate AN5 is also "0", and no all-axles-slipping information is available.

During the time required to go from time t1 to time t2, the speed differential between the speed V1 and the standard speed $V_{max}$ exceeds the set value $V_{\alpha 1}$, and only the output of the first speed differential comparators C11 is "1". The output of the OR gate OR5 becomes "1", but prior to this, the output of the AND gate AN5 is "0", so that the output of the AND gate AN5 remains "0". Thus, the set number of the high-sensitivity axle-slipping evaluation circuit HT is three (3), so that the output of the OR gate OR1 remains "0", and the output of the OR gate OR6 also remains "0". Thus, during time between times t1-t2, the output of the AND gate AN5 is also "0", and no all-axles-slipping information is released. In addition, at this time, conditions of the deceleration detection circuit KK and the low-sensitivity slip-detection circuit LK are the same up to time t1, and the OR gate OR4 and inverter IV2 outputs are "1".

When time t2 expires, and up to time t3, the speed $V_3$ along with the speed V1, have the speed differential with the standard speed exceeding the first set value $V_{\alpha 1}$. The outputs of the first speed differential comparators C11 and C13 become "1", and the output of the OR gate OR5 is also "1". This is similar to the interval between said time t1-t2 so that the outputs of the AND gate AN6 and OR gate OR1 are "0", and the output of the OR gate OR6 remains "0". As a result, during the time period t2-t3, the output of the AND gate remains "0", and not axle-slip information is released. Furthermore, the states of the deceleration detection circuit KK and the low-sensitivity slip-detection circuit LK are the same as up to the time t3, and the outputs of the OR gate OR4 and inverter IV2 remain "1".

When time t3 expires, in addition to speeds V1 and V3, V2 has a speed differential with the standard speed $V_{max}$ exceeding a first set value $V_{\alpha 1}$ and the three (3) outputs at the first speed differential comparator C11-C13 of the high-sensitivity slip-detection circuit HK become "1". Since the set number of the high-sensitivity axle-slip evaluation circuit HT is three (3), the output of the OR gate OR1 becomes "1" despite the output of the AND gate AN6 being "0", and the output of the OR gate OR6 becomes "1". During the interval between times t3 and t4, the states of deceleration detection circuit KK and low-sensitivity slip-detection circuit LK remain the same up to time t3, and the outputs of the OR gate OR4 and the inverter IV2 remain "1". As a result, when time t3 is passed, the output of the AND gate AN5 becomes "1", and all-axles-slipping, sluggish-slip information is released.

Then, based on this all-axles-slipping information, the braking force is increased, and when time t4 is passed, speeds V1-V4 begin to recover. On the other hand, during the interval between and up to time t5, all the speed differentials exceed the first set speed $V_{\alpha 1}$ so that the output of the OR gate OR1 is "1". Thus, the two (2) inputs to the AND gate AN6 are "1", and its output becomes "1" so that the output of the OR gate OR6 remains "1". At the same time, every speed V1-V4 is in a recovery status, so that their degrees of acceleration are all less than the standard acceleration, and the outputs of all the accelerating comparators C31-C34 of the deceleration detection circuit KK are "0". The inverter IV3 output is "1", and the OR gate OR4 output is "1". In addition, at this time, there is no speed which exceeds the standard deceleration speed, and there is not speed differential which exceeds the second fixed value $V_{a2}$ so that the outputs of all the comparators C21–C24 of the low-sensitivity slip-detection circuit LK and C01–C04 are "0" while the inverter IV2 output is "1". As a result, during the interval between time t4–t5, the all-axles-slipping information is to be expected. Furthermore, when at least one of the accelerations exceeds the standard acceleration, the output of the corresponding accelerating comparator becomes "1", and the output of the OR gate OR3 becomes "1". The output of the inverter IV3 becomes "0", but the OR gate OR4 has a feedback of "1" from the AND gate AN5, which is the all-axles-slipping information to bring about a self-retention or holding condition. Thus, the output of the OR gate OR4 remains at "1", and the all-axles-slipping information is in the self-retention or holding state.

As we approach time t5, the basic speed $V_{max}$ of speed V2 has a speed differential with respect to $V_{max}$ which is below the first set value, and the speed differential which exceeds the first set value becomes two (2), thus, the high-sensitivity number of slipping axles circuit HT of the OR gate OR1 output becomes "0". However, the two (2) outputs of the first speed comparators C11 and C13 are at "1" so that the output of the OR gate OR5 is also "1" and, together with the output of the AND gate AN5, which is an all-axles-slipping information, is at "1" which is fed back to the AND gate AN6. Thus, the AND gate AN6 is in a self-retention or holding state and its output remains "1", so that the OR gate OR6 output retains the value "1". At this time, the deceleration detection circuit KK and the low-sensitivity slip-detection circuit LK are in the same state as they were during the time interval t4–t5. The stick circuit of the OR gate OR4 outputs "1" for a self-retention, and the output of inverter IV2 is "1". As a result, even in this time interval t5–t6, the output of the AND gate AN5 remains "1", and the all-axles-slipping information is retained.

When time t6 is reached, the speed differential relative to the standard speed $V_{max}$ of speed $V_{a1}$, with respect to speed V2, falls below the first set value $V_{a1}$, and the speed differential which exceeds it becomes "1". The output of the OR gate OR1 of the high-sensitivity axle-slipping evaluation circuit HT remains "0", which is similar to that of the time interval t5–t6. The output of the first speed differential comparator C13 is at "1" and the output of the AND gate AN5 is also "1", which causes the output of the AND gate AN6 to stay at "1". As a result, the output of the OR gate OR6 is also set at "1". At this time, as in time interval t5–t6, the outputs of the OR gate OR4 and the inverter IV2 are "1". Thus, even during time interval t6–t7, the output of the AND gate AN5 remains at "1", and the all-axles speed information is maintained in a self-retention state.

When time t7 is passed, all the speed differentials become less than the first set value $V_{a1}$, so that the high-sensitivity slip-detection circuit HK and the outputs of the comparators C11–C14 are at "0". The output of the OR gate OR1 remains at "0", while the output of the OR gate OR5 also becomes "0" along with that of the OR gate OR6. As a result, when time t7 is passed, the outputs of the OR gate OR4 and the inverter IV1 and the output of the AND gate AN5 become "0", and all the information disappears. In this state, it is assumed that all the wheels are not slipping and will remain in nearly normal speeds, and have decelerated.

Furthermore, the above state in which the axle-slipping information is self-maintained, and if for some reason it decelerates quickly, exceeding the basic deceleration and/or the deceleration exceeds the second set value $V_{a2}$, the low-sensitivity slip-detection circuit LK detects this situation and brings about corresponding decelerating information of the wheel and/or outputs low-sensitivity slip information, along with the output of the OR gate OR2, and becomes "1". The output of inverter IV2 becomes "0", so despite the outputs of the OR gates OR4 and OR6, the output and the AND gate AN5 becomes "0", and all slip information disappears.

Another graphic illustration, which slightly differs from that illustrated in FIG. 2, is shown in FIG. 3 and operates in the following manner.

It will be appreciated that up to time t10, there is no speed in any deceleration stage, so that the outputs of inverter IV3 and the OR gate OR4 are both "1". There is no speed which exceeds the standard deceleration so the output of inverter IV2 is at "1", and when the number of decelerations which exceed $V_{a1}$ is less than two (2), the state before this is attained as the output of AND gate AN5 at "0". Thus, the output of the OR gate OR6 is also "0". As a result, no axle-slip information is released before time t10.

During the time interval t10–t11, the deceleration speed of speed V2 exceeds the standard deceleration speed so that the output of the deceleration speed comparators C22 is "1" and the output of inverter IV2 becomes "0", regardless of the outputs of the OR gates OR4 and OR6, and thus no all-axles-slipping information is released. On the other hand, at this time, the deceleration speed information with regard to speed V2 is released.

During time interval t11–t12, speed V2 has recovered and its acceleration exceeds the standard acceleration, so that the output of the acceleration comparator C32 becomes "0". The output of inverter IV3 becomes "0", and the preceding state has the output of the AND gate AN5 at "0". Thus, the output of the OR gate OR4 is "0", regardless of the outputs of the inverter IV2 and the OR gate OR6. The output of the AND gate AN5 remains "0", and no all-axles-slipping information is released.

During time interval t12–t13, the speed differential of speed V1, with respect to the standard speed $V_{max}$, exceeds that of the second set value $V_{a2}$ so that the output of the second speed differential comparator C01 is "1". Thus, the output of inverter IV2 becomes "0", regardless of the state of the outputs of the OR gates OR4 and OR6. Thus, the output of the AND gate AN5 remains at "0", and no all-axles-slipping information is released. On the other hand, no low-sensitivity slip information is released at this time with respect to speed V1.

During time interval t13–t14, speed V1 has recovered and its acceleration exceeds the standard acceleration so that the output of the acceleration comparator C31 is "1". The output of the inverter IV3 is at "0" as is the output of the AND gate AN5 which is also "0". The output of the OR gate OR4 becomes "0" and, consequently, despite the outputs of the inverter IV2 and the OR gate OR6, the output of the AND gate AN5 remains "0" and no all-axles-slipping information is released.

During time interval t14–t15, the acceleration of speed V1 and V2 during recovery, is below that of the standard acceleration, so that the outputs of all the acceleration comparators C31–C34 are at "0". The outputs of inverter IV3 and OR gate OR4 become "1". The deceleration speed V3 is below the standard deceleration speed and, together with three of the speed differentials exceeding the first set value $V_{a1}$, but falling short of the second set value $V_{a2}$, the result is that the outputs of all the deceleration speed comparators C21–C24 and the second speed comparators C01–C04 become "0". The output of the inverter IV2 becomes "1" and, together with the outputs of three of the first speed differential comparators C11–C13, becomes "1". The outputs of the OR gates OR1 and OR6 become "1". The output of the AND gate AN5 becomes "1", and the all-axles-slipping information is released.

During time interval t15–t16, the situation is just as it was during the time interval t5–t6 (as shown in FIG. 2); and during the time interval t16–t17, the situation is the same as for the time interval t6–t7 in FIG. 2. Similarly, after time interval t17, the situation is the same as after time t7 in FIG. 2, so that any further explanation will be omitted for the purpose of convenience.

In both of the above-described examples, the number of wheels was assumed to be four (4) and the set number for the sluggish-slip, which is a determining factor in the evaluation of wheel-slip, was set at three (3). However, if the number of wheels n is more than three (3) and the set number is more than two (2), the present system can still be used effectively.

Similarly, in both of the examples, the low-sensitivity slip-detection circuit LK was comprised of the deceleration speed-detection circuit L1 and the speed differential detection circuit L2, but either one will do by itself, or a mode in which the speed differential's differentiated value is evaluated or a combination of these modes will also do.

Furthermore, in both of the examples, the high-sensitivity slip-detection circuit HK was assumed to evaluate the speed differential, but this can be replaced by an evaluation of the differential value of the speed differential.

As is clear from the description above, the following advantageous features and effects can be achieved by the subject invention:

1. When the majority of the wheels of the car go into a sluggish-slip and start a small slip almost simultaneously, it is usually the case that the speed differential, its differential value, or the deceleration speed is insensitive and will normally not exceed the large second set value so that they are unable to detect this situation. Under this condition, if there are no wheels which are accelerating, namely, under recovery, the effect of self-resticking viscous adhesion cannot be expected to occur. Thus, there is a possibility of all the wheels being locked-up, but when this invention is employed in such situations, a first set value, smaller than the second set value, is used jointly so that the speed differential, its differential value, or reduced speed exceeds the first set value. Thus, it is assumed that all the wheels are slipping and this information is relased and can be used by initiating a reinforced brake force on all wheels. Consequently, the viscous resticking property can be accelerated and the control distance can be effectively reduced so as to prevent the generation of flat spots on the outer rim of the wheels of the car.

2. When the value of the speed differential or its differential value has exceeded the first set value, or when an acceleration which exceeds the standard acceleration is present; in other words, when there is a wheel in the midst of recovery, namely, in acceleration, the situation is not evaluated as all axle-slip, namely, sluggish-slip, so that self-viscous resticking or self-readhesion phenomena can be utilized effectively and a reduction in control distance can be accomplished.

3. When there is a wheel in which a large slip has been initiated which could not be expected from its speed differential or its differential value, the situation is not evaluated as all wheels are slipping, so that only the slip of the particular wheel alone can be evaluated.

4. After all axle-slip information is released, even when there is a wheel in the process of recovery, all the wheels are restored to roughly normal speeds; that is, until the speed differentials are in an insensitive status, and recover to less than a small first set value, the all-axles-slipping information is self-retained so this information can be used to reinforce the braking force. Thus, all wheels can be controlled so that they will not generate sluggish-slip, and the reduction in said control distance and the prevention of the formation of flat spots on the outer rim of the wheels of the car can be avoided.

The following is a list of nomenclature in reference to the system of the present invention:
G1–G4: speed generator
S1–S4: speed detection system
V1–V4: speed—MAX: maximum speed generation circuit
$V_{max}$: basic speed—KK: deceleration detection circuit
LK: low-sensitivity slip-detection circuit
HK: high-sensitivity slip-detection circuit
HT: high-sensitivity number of slipping axles evaluation circuit
L1: deceleration speed detection circuit
L2: speed differential detection circuit
K2: standard deceleration n speed generator
K3: standard acceleration generator
$V_{a1}$: first set value
$V_{a2}$: second set value
The following list is pertinent to FIG. 1:
 1. speed generator
 2. speed detector
 3. acceleration
 4. standard acceleration
 5. deceleration detection circuit
 6. acceleration comparator
 7. acceleration information
 8. maximum speed generator
 9. standard deceleration speed
 10. deceleration speed detection circuit
 11. deceleration speed comparator
 12. deceleration speed
 13. deceleration speed information
 14. second standard speed generator
 15. second set value
 16. low-sensitivity slip-detection circuit
 17. second speed differential comparator
 18. speed differential detection circuit
 19. first set value
 20. first speed differential comparator
 21. first standard speed generator
 22. all-axles-slipping information
 23. high-sensitivity slip-detection circuit
 24. high-sensitivity number of slipping axles evaluation circuit The following list is pertinent to FIG. 2:
1. speed V
2. first set value α1
3. second set value α2
4. time t
5. wheel velocities V1, V2, V3, V4

The following list is pertinent to FIG. 3:
1. speed V
2. first set value α1
3. second set value α2
4. time t
5. wheel velocities V1, V2, V3, V4

It will be understood that various alterations and changes may be made by those skilled in the art without departing from the spirit and scope of the subject invention. Therefore, it will be appreciated that certain modifications, ramifications, and equivalents will be readily apparent to a skilled artisan and, accordingly, it is understood that the present invention is not to be limited to the exact embodiment shown and described but should be afforded the full scope and protection of the appended claims.

We claim:

1. A method for detecting wheel-slip comprising:
    (a) detecting the speed of at least three wheels of a railroad car using the wheel with the highest speed as the basic speed,
    (b) determining the speed differential of each wheel to ascertain a required amount of reduction of the speed when the speed exceeds a set level,
    (c) using said speed differentials to determine when a slip of the wheel will take place,
    (d) establishing the set value to be a first set value and a second set value having a value which is higher than the first set value,
    (e) ascertaining when the first set value is exceeded by the speed differential when all the speeds of the wheels are less than the second set value and the speed differential and all the degrees of acceleration determined by the differentiation of each wheel falling below the basic acceleration slipping is determined to be occurring on all the wheels so that information on all the wheels which are slipping forms a storable output, and
    (f) causing all the wheel-slipping information to be outputted regardless of the magnitude of the acceleration so that wheel-slipping information is stored and when at least one of the speed differentials has exceeded the first set value and the wheel-slipping information is stored.

2. A system for detecting wheel-slip comprising:
    (a) means for detecting the speed of at least three wheels of a railroad car,
    (b) means for using the wheel with the highest speed as the basic speed,
    (c) means for determining the speed differential of each wheel to ascertain the amount of reduction of the speed when the speed exceeds a set level,
    (d) means for using the speed differentials to determine when a slip of the wheel will take place,
    (e) means for establishing the set value to be a first set value and a second set value with a value higher than the first set value,
    (f) means for ascertaining when the first set value is exceeded by the speed differential when all the speeds of the wheels are less than the second set value and the speed differential and all the degrees of acceleration determined by the differentiation of each wheel falling below the basic acceleration slipping is determined to be occurring on all the wheels so that information on all the wheels which are slipping forms a storable output, and
    (g) means for causing all the wheel-slipping information to be outputted regardless of the magnitude of the acceleration so that wheel-slipping information is stored and when at least one of the speed differentials has exceeded the first set value and the wheel-slipping information is stored.

* * * * *